May 22, 1934.    H. R. MOULTON    1,960,121
GLASS TREATMENT
Original Filed Feb. 10, 1930
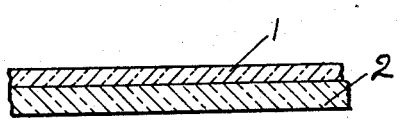
FIG. I
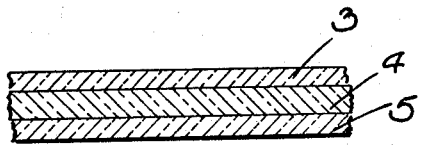
FIG. II
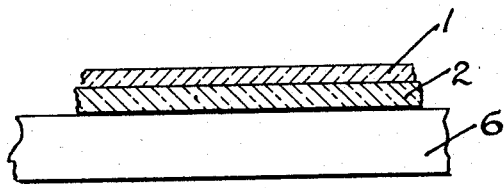
FIG. III
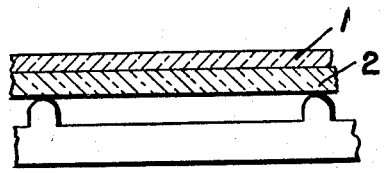
FIG. IV
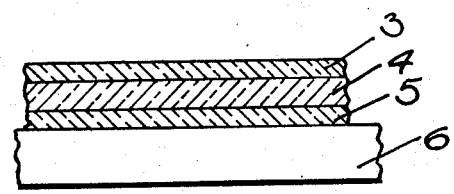
FIG. V
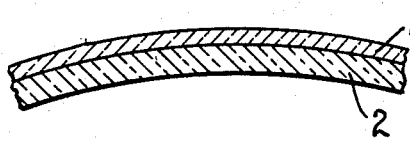
FIG. VI
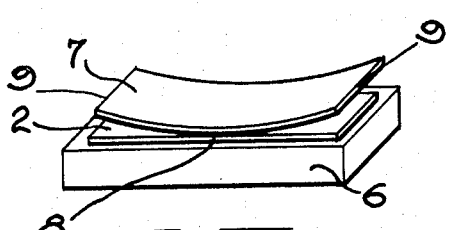
FIG. VII
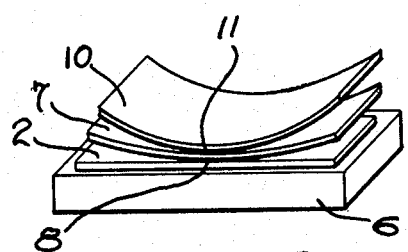
FIG. VIII
INVENTOR
HAROLD R. MOULTON
BY Harry H. Styll
ATTORNEY Patented May 22, 1934

1,960,121

UNITED STATES PATENT OFFICE 1,960,121

GLASS TREATMENT

Harold R. Moulton, Sturbridge, Mass., assignor to American Optical Company, Southbridge, Mass., a voluntary association of Massachusetts Application February 10, 1930, Serial No. 427,202
Renewed November 10, 1932

5 Claims. (Cl. 49—82)

This invention relates to improvements in glass treatment and has particular reference to the process of producing strengthened glass and to the product of said process.

The principal object of this invention is to provide a glass composed of layers having different coefficients of expansion to lend strength thereto and also having similar indices of refraction throughout the layers to produce good definition or no distortion of objects viewed therethrough.

Another object of this invention is to provide means whereby articles requiring a high surface finish and good definition of image such as lenses, may be finished after strengthening without in any detracting from their strength.

Another object of this invention is to provide means whereby the said improved glass may be made by a process having simple and familiar steps.

Another object of this invention is to eliminate the breakage and poor quality of articles made by the usual strengthening processes.

Other objects and advantages will become apparent from the following description taken in connection with the accompanying drawing and it will be apparent that many changes may be made in the details of construction, arrangement of parts and steps in the process without departing from the spirit of the invention as expressed in the accompanying claims. I therefore, do not wish to be limited to the exact details shown and described as the preferred forms only have been shown by way of illustration.

In the drawing:—

Fig. I is a sectional view of one form of my invention.

Fig. II is a sectional view of a modified form.

Fig. III is a sectional view of further modification.

Fig. IV is a sectional view of an alternative method of accomplishing the modification shown in Fig. III.

Fig. V is a sectional view of a further modification of the method shown in Fig. III.

Fig. VI is a diagrammatic sectional view illustrating an exaggerated strain in compound glass.

Fig. VII is a perspective view of a modified method of fusing two layers of glass together.

Fig. VIII is a perspective view illustrating a modification of the process shown in Fig. VII.

Prior to my invention there were two principal methods of strengthening glass, both of which were unsatisfactory from various standpoints.

One of the methods consisted in heating the glass and quenching it by various means such as in oil, air or steam. This method produced a thin skin of hardened glass on the surface, but it will be apparent that this thin skin could be easily removed if any surfacing or polishing process was carried out after the hardening. This greatly restricted the use of this method as articles such as lenses had to be finished before hardening and then subjected to this process which invariably spoilt their definition by causing blemishes and irregular index changes and often broke them entirely from the sudden cooling and because of internal strains. It was practically impossible to produce ophthalmic lenses by this process or any article requiring a clear visual body.

The other prior art method of strengthening glass comprised securing together two or more layers of glass having different coefficients of expansion. The theory underlying this method was that the layer of glass having the higher coefficient of expansion would shrink (when the temperature dropped after uniting the layers by heat) more than the layer having the lower coefficient of expansion so that one layer would be in tension and the other in compression. Any blow or sudden temperature change received on the side under compression was withstood much better than it would have been if the glass on that side was not under compression or if it was under tension, since it is well known that glass under compression offers greater resistance to sudden heating or cooling or mechanical shocks than one under tension or without compression.

This process was satisfactory where the glass was not used for visual purposes and it made satisfactory boiler gauge tubes, lamp chimneys and cooking vessels. As the indices of refraction of the different glass layers were not controlled however, the effect upon looking through such glass was much the same as that of a multifocal lens, since the various kinks and bends formed power curves due to the different indices of refraction and these destroyed all definition of objects viewed therethrough.

It is the prime object of my invention, therefore, to combine the advantages of this latter process in regard to strength and at the same time combine good definition of objects therewith. This combination of advantages renders this improved glass of wide application inasmuch as any glass article may be made therefrom when said article is to be used between the eye and an object or for the projection of images or for any other use necessitating clear visual qualities in the glass.

Referring to the drawing the numeral 1 denotes a layer of glass of one index of refraction and one coefficient of expansion. Secured to this layer 1 is a second layer 2, having a similar index of refraction as glass 1 but having a higher coefficient of expansion. It will be understood that the indices of refraction and the coefficients of expansion may be of any desired values. As is well known, there is a relationship between the thickness of the layers and the coefficients of expansion in combined glass layers whereby the ratio of the thickness of the layers is governed by the difference in the coefficients of expansion. For example, if the coefficients of expansion of the glasses 1 and 2 are close to each other the ratio of thickness of the layers may be low; and conversely if the expansions are far apart then the ratio of thickness must be high. The layer of lower coefficient of expansion is, under this rule, always the thinner of the layers, as in Fig. 1, where numeral 1 denotes the lower coefficient layer.

By controlling the indices of refraction of layers 1 and 2 it will be apparent that novel means have been provided to produce strengthened glass having good definition and suitable for use where clear visual qualities are to be combined with resistance to temperature changes and sudden shocks. This glass can also be finished after hardening as there is no risk of removing a thin skin as in quenched glass and it is much cleaner and superior in every way to quenched glass.

In the manufacture of this improved glass the well-known process of making case glass is preferably utilized, although other methods, such as fusing, may be used if desired.

In the case glass process the glass for the layers 1 and 2 is made in different crucibles, one glass having a lower coefficient of expansion than the other and both having similar indices of refraction. Glass from one crucible is gathered and blown and then cased with the glass from the other crucible after which the blown cylinder may be cut into strips, flattened and cut to shape. This process is the usual one for case glass, but the control of the indices of refraction to obtain the desired result is, as far as I am aware, novel to my invention.

The glasses 1 and 2 are united while soft so that at that temperature no strain exists. As the temperature drops, glass 2 of higher coefficient of expansion shrinks more than glass 1, of lower coefficient of expansion. This puts glass 1 in compression and glass 2 in tension. Any blow received upon glass 1 is withstood far better than if this side was not under compression or was under tension which follows the well-known rule regarding strength in glasses.

If the glass is to be used for lenses, windshields or other articles where strength to resist shock must be combined with good visual qualities, the strengthened glass may be cut to desired shape, surfaced to any curvature and polished to any degree required. Owing to the similarity between the indices of refraction of the layers any slight waves or irregularities will not destroy definition, as they would do if the indices are different and not controlled.

In mounting articles such as lenses or windshields the glass 1 under compression is faced towards the side exposed to the hazard of flying missiles as will be apparent. This glass may be curved or shaped in any manner depending upon the required shape desired.

As a modification I can combine as many layers of glass as desired and as shown in Fig. II. I can unite three such layers. The two outer layers 3 and 5 are preferably of lower coefficient of expansion than the inner layer 4, although all the three layers are preferably of similar index of refraction. This type of construction will readily bear the brunt of shocks on both faces 3 and 5 and is made similarly to the method outlined for the type illustrated in Fig. I.

If it is more desirable to fuse instead of casing the glasses together other factors enter into the requirements and I have provided novel means of accomplishing the fusing process with as much facility as the casing process.

The indices of refraction of the glasses used should, of course, remain substantially equal, but in addition there should be a difference in the fusing or softening points of the glasses which will facilitate the operation and give a better product.

It will be understood, therefore, that for fused compound glass I prefer to control three factors, e. g., the coefficients of expansion, the indices of refraction and the softening or fusing points.

By reference to Fig. III it will be clear that the control of the softening point is an advantageous feature of the fusing process. The glasses 1 and 2 are placed on a refractory block 6 and when fused together glass 1 will be in compression and glass 2 in tension as described in the casing process. I prefer that the glass 2 under tension should have a fairly high softening point in order that the surface in contact with the refractory block 6 will not become plastic enough before fusing to be marred by the refractory block or to sag if the glasses are supported only at their edges as shown in Fig. IV. The glass 1 to be under compression is preferably of a lower softening or fusing point than the glass 2 in order to accomplish the advantageous results stated. It will be understood that the indices of refraction and the coefficients of expansion remain as before, but with the additional factor of control of the softening or fusing points of the glasses.

Pursuing the foregoing rule I may in fusing a three component article, as shown in Fig. V where glasses 3 and 5 are to be in compression and glass 4 in tension, contrive that the softening or fusing points are graded from high to low from the bottom glass 5 to the top glass 3. Hence, glass 5 will have the highest fusing point, glass 4 intermediate and glass 3 of low fusing point.

This arrangement holds good for any number of layers if it be remembered that the glass nearest the refractory block 6 should have the highest fusing point of the component glasses used. In regard to the latter process of fusing a three component article I have found that this construction is to be preferred to the two component article where large surfaces are secured together. It is known that the tendency of a composite plate of two glasses secured together is to warp and curve towards the side under tension as shown in Fig. VI, so that this side becomes a concave curve instead of remaining flat. In lenses or other articles of a small nature this warping is negligible, but it is desirable on large articles to prevent this. I have found that by utilizing a three component construction as in Fig. II this warping is prevented. It is obvious that when, as in Fig. II the compression of glasses 3 and 5 is equal on both sides of the middle glass 4 which is in tension, no warping can result. This equal compression of glasses 3 and 5 may be obtained always unless there is a great disparity between the coefficients of expansion or thickness of glasses 3 and 5.

In Fig. VII I have illustrated a method by which the fusing of two layers may be accomplished without the danger of bubbles forming between the contacting surfaces of the layers. In Fig. VII the process is shown applied to a three layer combination and it will be apparent that any number of layers may be secured together in this manner.

In utilizing this novel method and in reference to Fig. VII I preferably have the lower layer 2, as before, of a higher softening point and higher coefficient of expansion than the upper layer 7.

The indices of refraction of the two layers 2 and 7 are, of course, similar. The upper layer 7 is preferably curved so that a line contact is obtained at 8 with the lower layer 2 which rests on the usual refractory block 6. When, under heat, the upper layer 7 of lower softening point wilts and drops, it will do so from the line 8 outwards and the air between the layers will be expelled from the line 8 outwardly until the terminal ends 9 of the upper layer 7 eventually reach and contact with the lower layer 2. This process eliminates the bubbles which usually form between fused surfaces and a far superior product results.

Applying this method to a three layer combination, as shown in Fig. VIII, the lower layer 2 is, as before, of flat surface and in contact with the block 6. The layer 7 may be placed, also as before, upon the layer 2 and above this the third layer 10. If the layer 10 is made of greater curvature than the layer 7 a line contact will be formed at 11. It will be understood that layer 2 is of high fusing point and layers 7 and 10 graded in descending values, as previously stated, so that layer 10 has the lowest softening or fusing point. It will be obvious, therefore, that layer 10 will first drop from the center line contact 11 outwardly and then layer 7 will do likewise, thus eliminating all bubbles from between the contact surfaces. This may be applied to any number of layers as will be apparent as long as steeper curvatures are used for each additional layer.

The application of this improved strengthened glass is very wide as will be apparent. Practically any article of glass which is used to look through or have images projected there-through will be benefitted by being strengthened. It will be understood that in the two-layer fused construction the described order may be reversed and glass 1 in Fig. III may be nearest the block. In this way the side nearest the block may be surfaced after strengthening and the other side untouched. All the drawbacks of prior strengthened glass have been eliminated and this useful strengthening process made available for use on the wide variety of articles used for visual purposes. In the manufacture of ophthalmic lenses for protection goggles this invention is of particular merit, inasmuch as much time and material have heretofore been devoted to producing an inadequate and poor product by prior art methods such as those described herein.

The foregoing description will clearly show that simple and novel means have been provided to carry out the objects of the invention and that the article produced is in every way superior to those produced by prior methods while being much more economical owing to the lesser risk of breakage in the manufacturing process.

Having described my invention, I claim:

1. The process of forming a strengthened glass having clear visual characteristics comprising forming a sheet of glass of a given index of refraction and coefficient of expansion to a calculated thickness, forming a second piece of glass of the same index of refraction as the first piece and of a different coefficient of expansion to a calculated thickness, subjecting the said piece of glass to heat to cause the same to unite and allowing said pieces to cool whereafter one of said pieces will be in tension and the other will be in compression and surfacing the two exposed faces of the united glass to a smooth polished surface.

2. The process of forming a strengthened glass having clear visual characteristics comprising forming a piece of glass of a given index of refraction and coefficient of expansion to a calculated thickness, forming a second piece of glass of the same index of refraction as the first piece and of a different coefficient of expansion to a calculated thickness, forming a third piece of glass of the same index of refraction and coefficient of expansion as the first piece and to a calculated thickness, placing the second piece of glass having a different coefficient of expansion between the first and third pieces of glass, subjecting the said pieces of glass to heat to cause the same to unite and allowing said pieces to cool whereafter the central piece of glass wil be in tension and the outer pieces of glass will be in compression and surfacing the exposed faces of the pieces of glass to a smooth polished surface.

3. A composite strengthened glass having uniform optical definition at all points throughout its area comprising superimposed layers of glass, one of said layers being in tension and the other in compression.

4. A composite strengthened glass comprising layers having substantially identical indices of refraction and predetermined differences of coefficients of expansion, one of said layers being in tension and the other in compression.

5. A composite strengthened glass comprising three layers of glass in superimposed relation with each other, the outer layers being of substantially the same indices of refraction and coefficients of expansion and the inner layer being of substantially the same index of refraction but of a predetermined greater coefficient of expansion.

HAROLD R. MOULTON.